United States Patent [19]
Burgdorf et al.

[11] Patent Number: 4,674,804
[45] Date of Patent: Jun. 23, 1987

[54] HYDRAULIC BRAKE SYSTEM

[75] Inventors: Jochen Burgdorf, Offenbach-Rumpenheim; Hans-Dieter Reinartz, Frankfurt am Main, both of Fed. Rep. of Germany

[73] Assignee: ITT Industries, Inc., New York, N.Y.

[21] Appl. No.: 680,754

[22] Filed: Dec. 12, 1984

[30] Foreign Application Priority Data

Dec. 17, 1983 [DE] Fed. Rep. of Germany ....... 3345694

[51] Int. Cl.$^4$ .......................... B60T 8/18; B60T 8/58
[52] U.S. Cl. ..................... 303/6 R; 60/545; 60/547.1; 188/181 T; 188/195; 303/10; 303/15; 303/22 R; 303/112; 303/100; 303/114; 303/119
[58] Field of Search .................. 303/22 R, 22 A, 100, 303/119, DIG. 1–DIG. 4, 116, 10–12, 6.1, 7–8, 13–15, 6 R, 6 A, 93, 96, 98, 114, 112, 48, 49, 15; 188/195, 345, 355–360, 181, 181 T, 3, 112; 60/550, 555, 545, 547.1

[56] References Cited

U.S. PATENT DOCUMENTS

| | | | |
|---|---|---|---|
| 3,350,142 | 10/1967 | Schuman | 303/10 X |
| 3,689,121 | 9/1972 | Kawabe et al. | 303/112 |
| 3,743,361 | 7/1973 | Vieth, Jr. | 303/112 |
| 3,856,362 | 12/1974 | Howard | 60/545 X |
| 3,887,238 | 6/1975 | Bennett | 303/10 X |
| 3,944,287 | 3/1976 | Nagase | 303/15 |
| 3,951,464 | 4/1976 | Donahue et al. | 303/10 X |
| 4,071,283 | 1/1978 | Van House | 303/114 |
| 4,093,316 | 6/1978 | Reinecke | 303/22 R X |
| 4,358,163 | 11/1982 | Young | 303/22 R |
| 4,418,966 | 12/1983 | Hattwig | 303/22 R X |

FOREIGN PATENT DOCUMENTS 0062246 10/1982 European Pat. Off. .
0077244 5/1982 Japan ................................. 303/112

Primary Examiner—Douglas C. Butler
Attorney, Agent, or Firm—James B. Raden; William J. Michals

[57] ABSTRACT

A hydraulic brake system for automotive vehicles with at least one load sensor (41) sensing the load condition of the vehicle and with at least one sensor (14, 15, 21, 22) associated wtih each vehicle axle for the detection of a braking parameter decisive for the braking operation. The measured values sensed are supplied to an electric evaluation circuit (18) which during a braking operation permanently computes suitable braking pressure values for the wheel brakes (3, 4) of the rear axle and delivers corresponding control signals to a braking pressure modulator (31, 53, 54). A braking force sensor (14, 15, 21, 22) is associated with at least one vehicle wheel (12, 13, 19, 20) of each vehicle axle. By measuring the braking force actually transmitted to the road surface via the electronic evaluation circuit (18), braking pressure is adjusted in the wheel brakes (3, 4) of the rear axle which allows for the existing marginal conditions such as allowance made for friction value variations of the brake pads of the wheel brakes (1, 2, 3, 4).

8 Claims, 5 Drawing Figures

HYDRAULIC BRAKE SYSTEM

BACKGROUND OF THE INVENTION

This invention relates to a hydraulic brake system for automotive vehicles, with at least one load sensor sensing the load condition of the vehicle and with at least one sensor associated with each vehicle axle for the detection of a braking parameter decisive for the braking operation, with the measured values sensed being supplied to an electric evaluation circuit which during the braking operation permanently computes suitable braking pressure values for the wheel brakes of the rear axle and delivers corresponding control signals to a braking pressure modulator.

European Patent Publication (EP) No. 0 062 246 A1 discloses a brake system which features the above characteristics. In this publication a hydraulic brake system is described where at least at the rear axle of the automotive vehicle a sensor is arranged which registers the respective load conditions of the vehicle and delivers a corresponding electric signal to an electric evaluation circuit. A tandem master cylinder is used in this known brake system. A first chamber of the tandem master cylinder pressurizes the wheel brakes of the front axle of the automotive vehicle while, by way of a braking pressure modulator, and a second working chamber hydraulically communicates with the wheel brakes of the rear axle. Further, the brake system has measuring devices which register the respective pressure prevailing in the wheel brakes and transform it into electric signals which likewise are supplied to the electric evaluation circuit.

A pressure control valve serves for modulation of the hydraulic braking pressure in the wheel brakes of the rear axle of the automotive vehicle. Said pressure control valve reduces the pressure supplied to the rear wheel brakes relative to the pressure in the front wheel brakes in accordance with a predetermined characteristic line. In addition, the output signal of the evaluation circuit is supplied to the pressure control valve. Thus one may vary the control behavior of the braking pressure modulator largely at discretion in dependence on the respective marginal conditions present.

As becomes evident from the above, the output signal of the evaluation circuit is decisively dependent on the hydraulic pressures generated in the wheel brakes. This, however, is disadvantageous in that it is impossible to absolutely avoid overbraking of the rear axle of the automotive vehicle; it being assumed, that the front wheel brakes are pressurized by a hydraulic pressure which leads to a lock-up of the vehicle wheels associated with the front wheel brakes. In accordance therewith, the evaluation circuit computes a hydraulic pressure for the rear wheel brakes which admittedly is reduced as compared with the pressure in the front wheel brakes, which, however, may be above the lock-up pressure.

It is thus an object of the present invention to further develop a hydraulic brake system of the type referred to so as to positively avoid a lock-up of the rear wheels of the automotive vehicle.

SUMMARY OF THE INVENTION

According to this invention, this object is attained in that a braking force sensor is associated with at least one wheel of each vehicle axle. Such sensors are known in itself and supply an output signal proportional to the braking force actually transmitted between the vehicle's tires and the road surface. In the simplest case, it is conceivable to use a measuring arrangement as braking force sensor, in each case the measuring arrangement registering the torsion of a shaft connected with the wheel to be braked. By using braking force sensors it is possible to effect a braking pressure distribution corresponding to almost ideal conditions. Independently of the pressure prevailing in the front wheel brakes a rear wheel braking pressure is established in correspondence with the measured braking force, the rear wheel braking pressure at least being reduced so that overbraking of the rear axle of the automotive vehicle is excluded. By using braking force sensors instead of pressure measuring devices it is also possible to correct influences which may result for example, from variations in the frictional coefficients of the brake pads.

In an advantageous embodiment of the present invention a master cylinder is provided which is used for the pressure supply to the wheel brakes of the front axle and that a braking pressure modulator is used for the pressure supply to the wheel brakes of the rear axle, with the brake circuits of the front and rear axles being hydraulically separated from each other. In this manner, a hydraulic brake system for an automotive vehicle is provided in which the brake circuit leading to the front axle is hydraulically separated from the brake circuit leading to the rear axle. Further, that a hydraulic or a pneumatic power booster can be provided which is connected upstream of the master cylinder. Moreover, it is advantageous for the master cylinder to have two working chambers separated from each other, each working chamber being connected with respectively one of the wheel brakes of the front axle. This will be of particular advantage in situations of trouble in which due to a leak, for example, there is a failure of a braking pressure line leading to the front axle brakes.

Advantageously, in the evaluation circuit various braking pressure distribution curves are stored which, in dependence on the output signal of the load sensor, determine the transmission behavior of the braking pressure modulator. To this end, the ideal braking pressure distribution curves are stored for various load conditions of the automotive vehicle. The load sensor registers the load condition of the automotive vehicle at standstill and delivers a corresponding electric signal to the evaluation circuit. By means of the output signal of the evaluation circuit a braking pressure distribution curve is selected which corresponds to the respective load conditions so that the pressure in the rear wheel brakes is reduced corresponding to the ideal braking pressure distribution ratio. As previously explained, in the brake system in accordance with the present invention the braking force is measured which is actually present between the road surface and the vehicle's tires.

It is thus possible to effect a correction of the braking pressure value stored in the evaluation circuit for the rear axle at any time. For example, if a hydraulic pressure was established in the front wheel brakes by way of the master cylinder, which pressure leads to a lock-up of the vehicle wheels associated with the front wheel brakes, the braking forces determined by the front axle brakes are correspondingly small. The direct result of this, however, is that the hydraulic pressure supplied to the rear wheel brakes is reduced so that overbraking of the rear axle of the automotive vehicle is positively excluded. An advantageous embodiment of the present invention further provides that an auxiliary pressure source is connected at the braking pressure modulator, said auxiliary pressure source consisting of a pressure medium accumulator, a pressure medium pump, and a pressure switch. In such an embodiment, the pressure supply to the rear wheel brakes is completely independent of the mode of operation of the braking pressure source connected with the front wheel brakes. In such an arrangement, the rear wheel brakes are pressurizable by a pressure generated in an auxiliary cylinder, said auxiliary cylinder having a booster chamber connectible with the pressure accumulator. Arranged between the pressure accumulator and the pressure chamber is an electromagnetically operable 3/2-way valve connected with the evaluation circuit. By means of said valve it is always possible to correct the pressure in the booster chamber of the auxiliary cylinder in correspondence with the characteristic line stored in the evaluation circuit and in dependence on the output signal of the evaluation circuit. Two 2/2-way valves may substitute for the 3/2-way valve. By means of the first directional valve which normally adopts a locking position it is possible to establish a communication between the pressure medium accumulator and the booster chamber of the auxiliary cylinder. The first 2/2-way valve switching into a locking position, the pressure in the booster chamber of the auxiliary cylinder or in the working chamber of the auxiliary cylinder, respectively, and in the rear wheel brakes connected therewith remains constant. By a corresponding actuation of the second 2/2-way valve connected between the booster chamber of the auxiliary cylinder and an unpressurized return reservoir it is possible to reduce the pressure in the booster chamber in correspondence with the respective marginal conditions present so that, also, there is a reduction of the pressure prevailing in the rear axle brakes.

In terms of cost, an especially advantageous embodiment of the present invention provides that sensors are exclusively arranged at diagonally opposite vehicle wheels and that, at the brake pedal, an electric contact is arranged which delivers a corresponding signal to the evaluation circuit upon the actuation of the brake. A further development of the present invention provides that the master cylinder has two working chambers one of which is connected with the two front axle brakes, the other one communicating with the two rear axle brakes by way of pressure control valve. In such a design of the hydraulic brake system the braking pressure modulator acts as a conventional braking force control device which is supplied with an additional control force by the evaluation circuit. The output signal of the evaluation circuit is variable within wide limits so that any braking pressure distribution is achievable between the front wheel brakes and the wheel brakes of the rear axle.

As an alternative in respect of the hydraulic actuation of the auxiliary cylinder it may be provided that a vacuum brake booster is connected upstream of the auxiliary cylinder pressurizing the rear wheel brakes. The pressure in the control chamber of the vacuum booster is influenceable by suitable valves. The valve means, again, receive their control signals from the evaluation circuit.

In a further embodiment it is provided that, by way of valve means controllable by the evaluation circuit, the rear wheel brakes are alternatively connectible with the pressure medium accumulator or with a return reservoir. In this connection it is advantageous if an individually actuatable valve is associated with each rear axle brake so as to allow an independent rating of the braking pressure in the rear wheel brakes. In doing so, on the one hand, it may be provided that the valve is a 3/2-way valve. On the other hand, it is conceivable that two 2/2-way valves actuatable independently of each other substitute for each of the 3/2-way valves. In a brake system with independently actuatable 2/2-way valves at the rear axle it is possible to realize phase of keeping the pressure constant in addition to phases of pressure build-up and pressure reduction.

BRIEF DESCRIPTION OF THE DRAWING

This invention is explained in more detail in the following, reference being made to the drawing in which.

DETAILED DESCRIPTION

Figure 1:
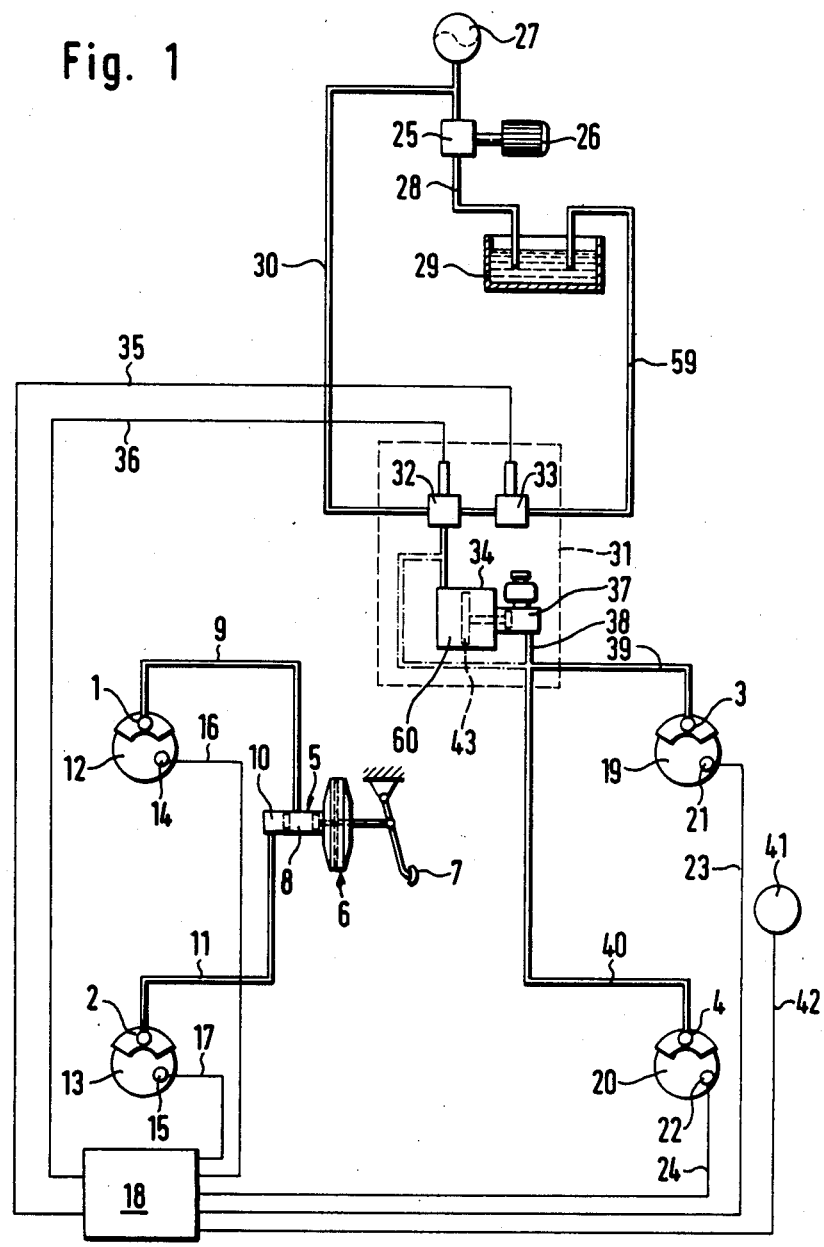
FIGS. 1 through 5 are system diagrams of hydraulic brake systems in accordance with the present invention.

In FIG. 1, the reference numerals 1, 2, 3, 4 designate four wheel brakes of an automotive vehicle. The wheel brakes 1, 2 are arranged at the front axle of the automotive vehicle. The wheel brakes 3, 4 are provided at the rear axle of the vehicle. A tandem master cylinder 5 is used for the pressure supply to the wheel brakes 1, 2 of the front axle. A vacuum brake booster 6 is connected upstream of the tandem master cylinder 5. Said vacuum brake booster 6 is operable by the driver of the vehicle by means of a brake pedal 7. A pedal-close working chamber 8 of the tandem master cylinder 5 communicates with the wheel brake 1 via a pressure line 9 while a second working chamber 10 hydraulically communicates with the wheel brake 2 via a pressure line 11. Braking force sensors 14, 15 are arranged at front wheels 12, 13 which may be braked by the wheel brakes 1, 2. Electric lines 16, 17 lead from the braking force sensors 14, 15 to an electronic evaluation circuit 18.

Vehicle wheels 19, 20 at the rear axle may be braked by the wheel brakes 3, 4 in a corresponding manner, braking force sensors 21, 22 being arranged at the vehicle wheels 19, 20 of the rear axle. Via electric lines 23, 24, also the braking force sensors 21, 22 are connected with the electronic evaluation circuit 18.

An energy supply system is used for the pressure supply to the wheel brakes 3, 4 at the rear axle of the automotive vehicle. Said energy supply system consists of an electric motor 26 driving a pressure medium pump 25. The outlet of the pressure medium pump 25 is connected with a hydropneumatic pressure accumulator 27. The suction side of the pressure medium pump 25 communicates with an unpressurized supply reservoir 29 via a hydraulic line 28. The hydropneumatic pressure accumulator 27 communicates with a braking pressure modulator 31 via a pressure line 30. The braking pressure modulator 31 substantially consists of two electromagnetically operable valves 32, 33 and of an auxiliary cyliner 34. The solenoid valves 32, 33 are connected with the electronic evaluation circuit 18 via electric lines 35, 36. Normally (when de-energized) the solenoid valve 32 adopts a closed position while, via the solenoid valve 33 and via a pressure line 59, normally there exists a hydraulic communication between a pressure chamber 60 of the auxiliary cylinder 34 and the unpressurized supply reservoir 29. A certain pressure being exceeded in the pressure chamber 60 of the auxiliary cylinder 34, a hydraulic pressure is generated in a working chamber 37 of the auxiliary cylinder 34. Said pressure reaches the wheel brakes 3, 4 of the rear axle of the automotive vehicle via pressure lines 38, 39, 40.

A further component of the brake system schematically respresented in FIG. 1 is a sensor 41 which registers the respective load condition of the automotive vehicle and which, via an electric line 42, delivers a corresponding electric signal to the electronic evaluation circuit 18.

In the following mode of operation of the described brake system will be explained in more detail, starting from the brake's release position in which all the moving parts have adopted the positions shown in FIG. 1 and in which no actuating force is exerted on the brake pedal 7. Further, it is assumed that the hydropneumatic pressure accumulator 27 has been charged up to a pressure value sufficient for the pressure supply to the wheel brakes 3, 4 at the rear axle of the vehicle.

As a result of an actuating force exerted on the brake pedal 7 the working chambers 8, 10 of the tandem master cylinder 5 are pressurized. Via the pressure lines 9, 11, the pressure established in the working chambers 8, 10 of the tandem master cylinder 5 reaches the wheel brakes 1, 2 provided at the front axle of the automotive vehicle, thus the front wheels 12, 13 being braked correspondingly. By means of the braking force sensors 14, 15 the slowing-down generated by the hydraulic pressure of the tandem master cylinder 5 is registered and transmitted to the electronic evaluation circuit 18 via the electric lines 16, 17.

The electronic evaluation circuit 18 receives an information via the electric line 42 about the momentary load condition of the automotive vehicle. In this respect, it is conceivable that the load condition of the automotive vehicle is registered via the sensor 41 exclusively at a standstill of the automotive vehicle. For example, the output value of the sensor 41 may be transmitted to the electronic evaluation circuit 18 via an electric contact closing when a door of the vehicle is opened. In the electronic evaluation circuit 18 braking pressure distribution curves are stored for various load conditions. The values thus stored in the evaluation circuit 18 correspond to ideal conditions.

The pressure medium accumulator 27 being charged, the pressure chamber 60 of the auxiliary cylinder 34 is pressurized via the solenoid valve 32 and the pressure line 30. Thus a booster piston 43 is displaced within the auxiliary cylinder 34 in the actuating direction and pressurizes the working chamber 37. The hydraulic pressure thus generated in the working chamber 37 of the auxiliary cylinder 34 reaches the wheel brakes 3, 4 of the rear axle of the automotive vehicle via the pressure lines 38, 39, 40. In correspondence with the output signal of the electronic evaluation circuit, the solenoid valve 32 is actuated by way of the electric line 36 (for example, by current pulses); thereby a pressure increase with any desirable variation may be effected in the pressure chamber 60 of the auxiliary cylinder.

At this time there is also a braking effect at the vehicle wheels 19, 20 of the rear axle of the automotive vehicle, corresponding electric signals of the braking force sensors 21, 22 reach the evaluation circuit 18 via the electric lines 23, 24. Due to the respective electric signals fed to the evaluation circuit 18 said evaluation circuit 18 permanently computes new braking values for the wheel brakes 3, 4 of the rear axle of the automotive vehicle and delivers corresponding control signals to the solenoid valves 32, 33. In such a control operation, in particular, influences are also allowed for which, e.g., result from friction value variations of the brake pads provided in the wheel brakes 1, 2, 3, 4. The special advantage of the brake system illustrated in FIG. 1 thus is to be seen in the fact that the pressure distribution in the wheel brakes 1, 2, 3, 4 does not correspond in any case to the ideal braking pressure variation but will come up to the respective marginal conditions present.

Figure 2:
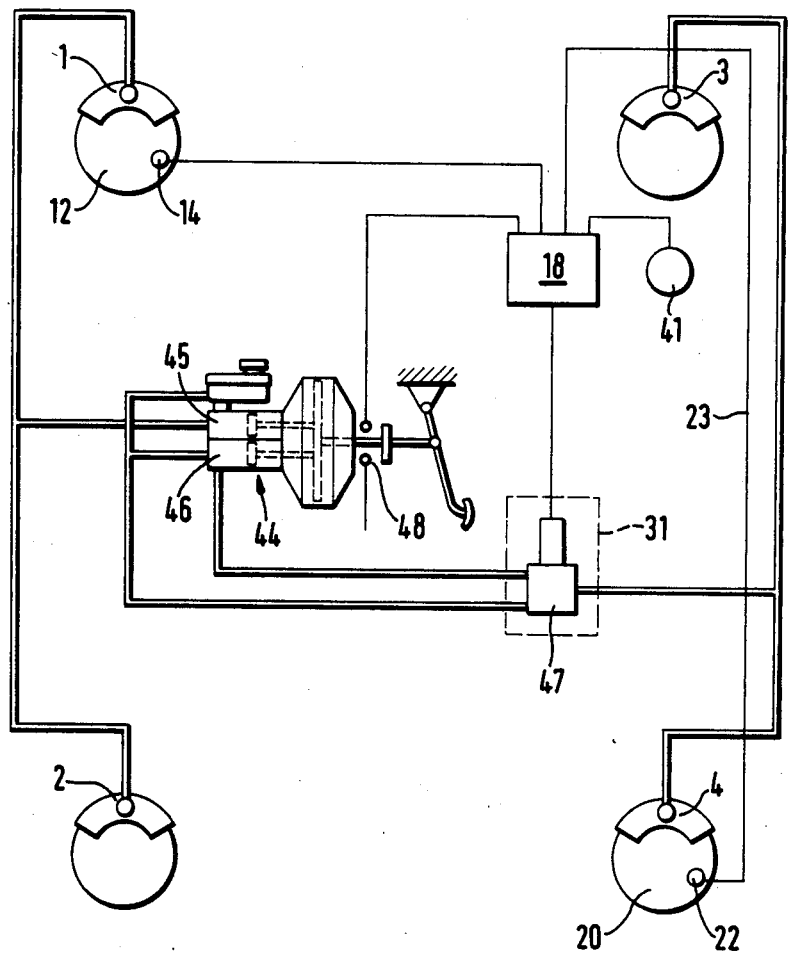

The hydraulic brake system illustrated in FIG. 2 differs from the brake system according to FIG. 1 essentially in that braking force sensors 14, 22 are exclusively arranged at the wheel brake 1 and at the wheel brake 4. Moreover, a twin master cylinder 44 replaces the tandem master cylinder 5 according to FIG. 1. The master cylinder 44 again has two working chambers 45, 46. The pressure generated in the working chamber 45 is supplied to the wheel brakes 1, 2 via corresponding pressure lines. The pressure of working chamber 46 reaches the braking pressure modulator 31. In a simple manner, the braking pressure modulator consists of a 3/2-way valve 47 receiving electric control signals from the electronic evaluation circuit 18. The control signals each time are dependent on the braking force measured at the vehicle wheel 12 and on the braking pressure characteristic line stored in the electronic evaluation circuit 18. Moreover, via the electric line 23, the electronic evaluation circuit 18 receives a signal corresponding to the braking force measured at the vehicle wheel 20. A further component of the hydraulic brake system illustrated in FIG. 2 is a pedal contact 48 via which a corresponding signal is supplied to the electronic evaluation circuit 18 as soon as there is an actuation of the brake. Thanks to the pedal contact 48 the electronic evaluation circuit 18 is able to tell a circuit failure in the hydraulic brake system from a variation in the friction value ratios between the vehicle's tires and the road surface or from a brake-releasing operation.

In the brake system illustrated in FIG. 3, again, braking force sensors 14, 15, 21, 22 are arranged at the vehicle wheels 12, 13, 19, 20. The essential difference of the brake system illustrated in FIG. 3 as compared with the hydraulic brake system according to FIG. 1 consists in that the braking pressure modulator 31 comprises a vacuum booster 49 by means of which the working chamber 37 of the auxiliary cylinder 34 is pressurizable. In the embodiment represented in FIG. 3 the pressure ratios in the vacuum booster 49 are controllable by a 3/2-way valve 50, the valve 50 receiving corresponding control signals from the electronic evaluation circuit 18. In a simple manner, two 2/2-way valves may replace the 3/2-way valve so that in addition to phases of pressure build-up and of pressure reduction in the working chamber 37 of the auxiliary cylinder 34 also phases may be achieved in which the pressure is kept constant. In the hydraulic brake system according to FIG. 3 a vacuum source 51 is used for the provision of an auxiliary energy. In the simplest case, said vacuum source 51 may be connected to the suction pipe of the automotive vehicle.

Figure 3:
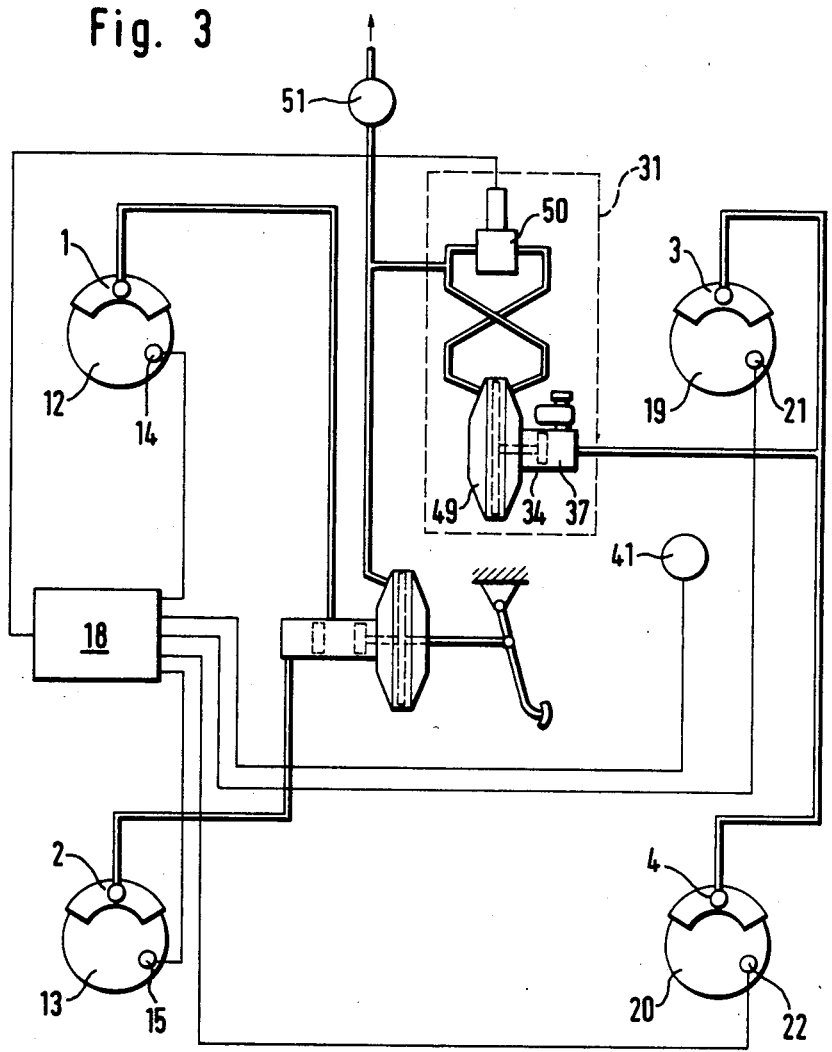
Figure 4:
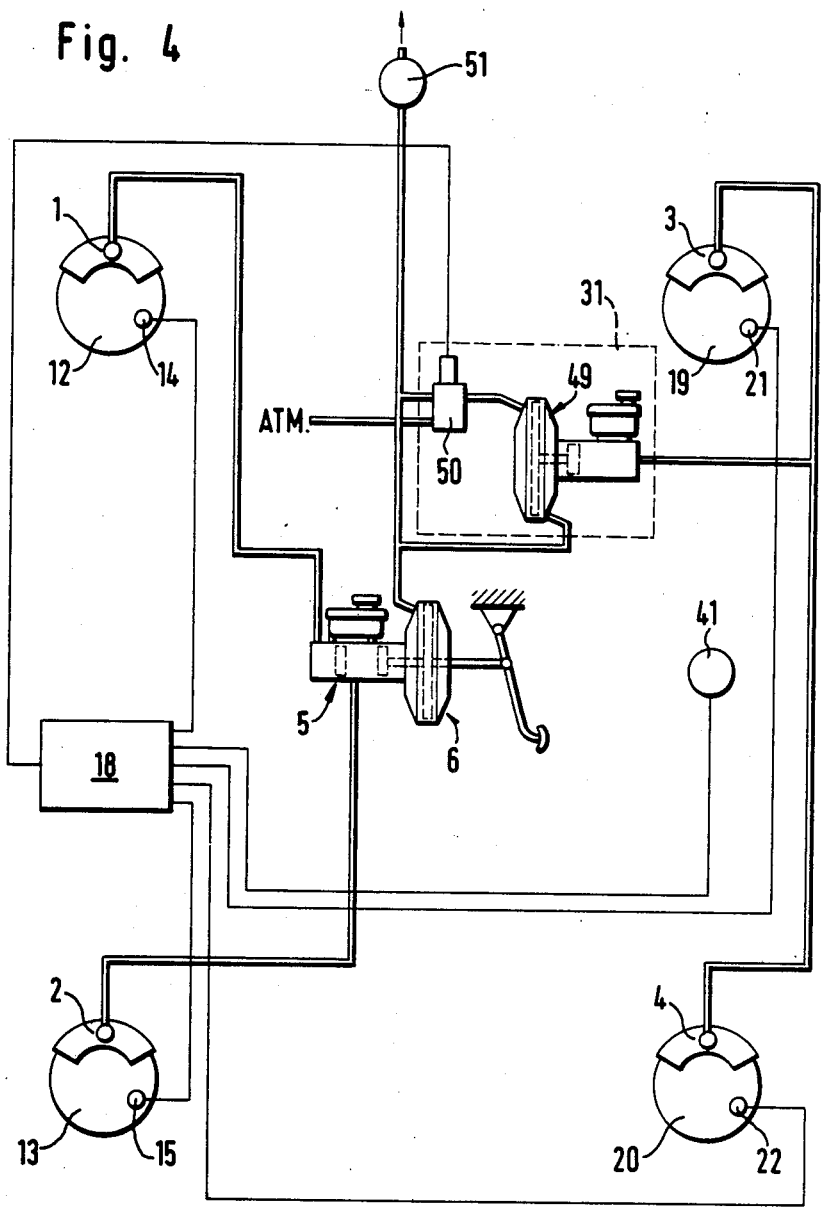

FIG. 4 shows a hydraulic brake system with a braking force modulator 31 which differs only slightly from the braking force modulator illustrated in FIG. 3. In this arrangement, via the solenoid valve 50, the pressure chamber of the vacuum booster 49 is alternatively connectible with the vacuum source 51 and with the atmosphere. Besides, in the brake system illustrated in FIG. 4 it is also possible without any difficulties to replace the 3/2-way valve 50 by two 2/2-way valves so that the pressure prevailing in the pressure chamber of the vacuum booster 49 can be kept constant for a longer period.

Finally, in the brake system illustrated in FIG. 5, again, braking force sensors 14, 15, 21, 22 are arranged at each vehicle wheel 12, 13, 19, 20. Said braking force sensors are connected with the electronic evaluation circuit 18 via electric lines. In correspondence with the brake system represented in FIG. 1, the hydraulic auxiliary pressure supply system again consists of a pressure medium accumulator 27, a pressure medium pump 25, and an electric motor 26 driving the pressure medium pump 25. The pressure supply to the front wheel brakes 1, 2 is effected by a tandem master cylinder 5. Different working chambers 8, 10 of the tandem master cylinder respectively supply a front wheel brake 1, 2. The outlet of the pressure medium accumulator 27 is connected with two valve blocks 53, 54 via a pressure line 52. The valve blocks 53, 54 form a braking pressure modulator corresponding to the braking pressure modulator 31 of the afore-described embodiments. Each braking pressure modulator 53, 54 has two 2/2-way valves 55, 56; 57, 58 electromagnetically actuatable by the evaluation circuit 18. In such a design of the brake system it is possible to individually adjust the effective braking pressure in the wheel brakes 3, 4 of the rear axle of the automotive vehicle or rather the braking force of resulting at the vehicle wheels 19, 20.

Figure 5:
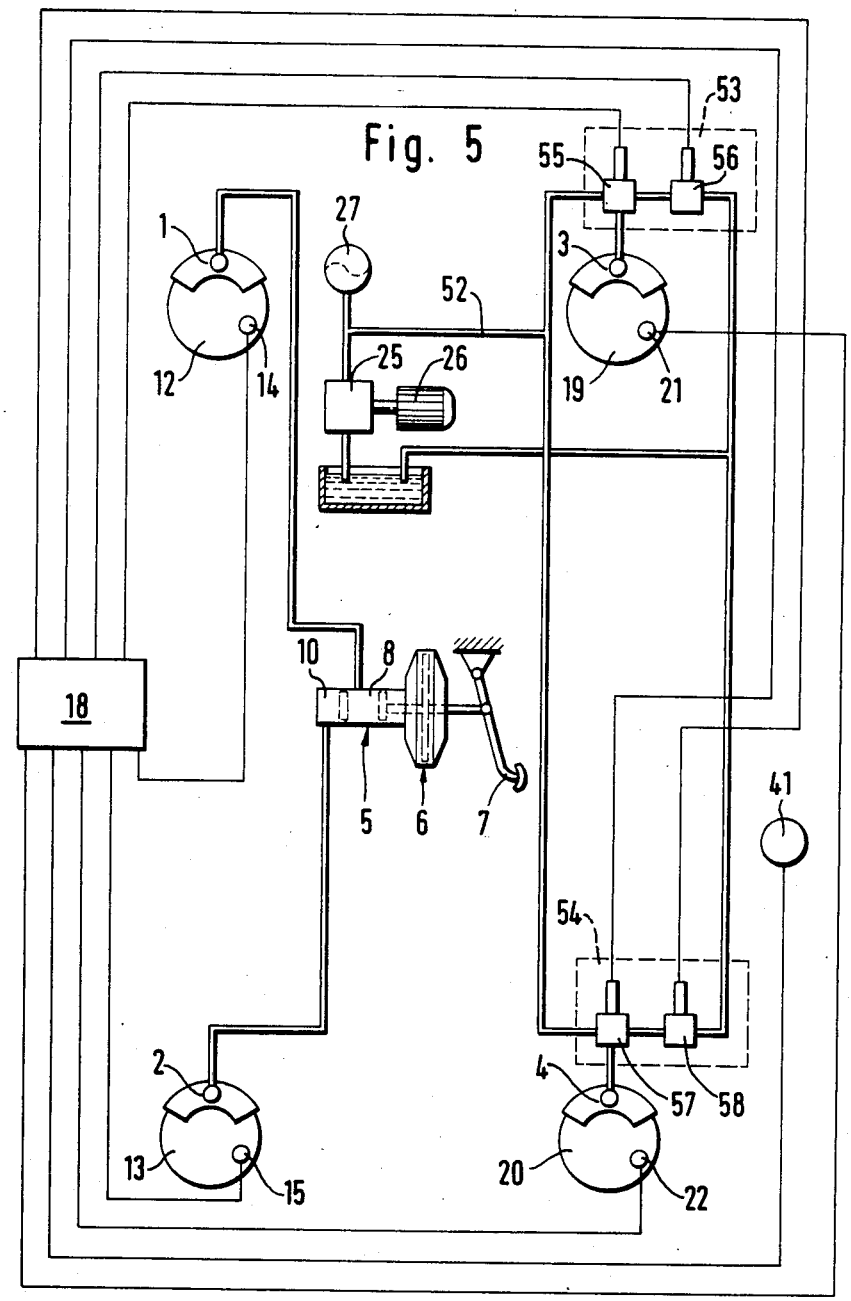

If a brake system according to FIG. 5 is used in an automotive vehicle not equipped with a locking differential gear at the rear axle, by means of the afore-described design it is possible, for example, when braking a spinning wheel, to shift the braking force transmitted to the rear axle to the vehicle wheel with the greater coefficient of adhesion. Thus, the brake system described in FIG. 5 also allows a favorable influencing of the tranction slip.

What is claimed is:

1. A hydraulic brake system for automotive vehicles having front and rear axles, with at least one load sensor sensing the load condition of the vehicle and with at least one sensor associated with each vehicle axle for the detection of a brake force parameter relating to braking operation, with the measured values sensed being supplied to an electric evaluation circuit (18) which during the braking operation permanently computes braking pressure values for the wheel brakes of the rear axle and delivers corresponding control signals to a braking pressure modulator, wherein said brake force sensor (14, 15, 21, 22) is associated with at least one wheel (12, 13, 19, 20) of each vehicle axle;
   wherein a master cylinder (5, 44) is used for the hydraulic pressure supply to the wheel brakes (1, 2) of the front axle and wherein a braking pressure modulator (31, 53, 54) is used for the hydraulic pressure supply to the wheel brakes (3, 4) of the rear axle, the brake circuits of the front and rear axles being hydraulically separated from each other; and
   wherein an auxiliary pressure source is connected at the braking pressure modulator (31, 53, 54), said auxiliary pressure source consisting of a pressure medium accumulator (27), and a pressure medium pump (25), which applies a hydraulic braking pressure to the wheel brakes of the rear axles in correspondence with the sensed brake force parameter, hydraulic braking pressure at the rear axles being independent of the hydraulic pressure applied to the wheel brakes of the front axle;
   wherein the pressure of the pressure medium accumulator (27) pressurizes a working chamber (37) of an auxiliary cylinder (34), with the working chamber (37) hydraulically communicating with the wheel brakes (3, 4) of the rear axle of the automotive vehicle;
   wherein the auxiliary cylinder (34) has a booster chamber (60) connectible with the pressure medium accumulator (27), and wherein an electromagnetic valve means (32, 33) is arranged between the pressure accumulator (27) and the booster chamber (60) and which is connected with the evaluation circuit (18).

2. A hydraulic brake system as claimed in claim 1, wherein sensors (14, 22) are exclusively arranged at diagonally opposite vehicle wheels (12, 20) and wherein, at the brake pedal (7), an electric contact (48) is arranged which delivers a corresponding signal to the electronic evaluation circuit (18) upon the actuation of the brake.

3. A hydraulic brake system as claimed in claim 2, the master cylinder (44) has two working chambers (45, 46) one of which is connected with the two front axle brakes (1, 2), the other one communicating with the two rear axle brakes (3, 4) via a pressure control valve (47).

4. A hydraulic brake system as claimed in claim 3, wherein the evaluation circuit (18) may supply the pressure control valve (47) with a variable control signal.

5. A hydraulic brake system as claimed in claim 4, wherein the auxiliary cylinder (34) pressurizing the rear axle brakes (3, 4) is pressurizable by a vacuum brake booster (49) controllable by a control valve.

6. A hydraulic brake system as claimed in claim 5, wherein the rear axle brakes (3, 4) are alternatively connectible with the pressure medium accumulator (27) or with a return reservoir (29) by way of valves (55, 56, 57, 58) controllable by the evaluation circuit (18).

7. A hydraulic brake system as claimed in claim 6, wherein an individually actuatable valve is associated with each rear axle brake (3, 4).

8. A hydraulic brake system as claimed in claim 6, wherein the valve is a 3/2-way valve.

* * * * *